Sept. 4, 1945.  S. M. MERCIER  2,384,188
SHEAR PIN MECHANISM
Filed June 25, 1942
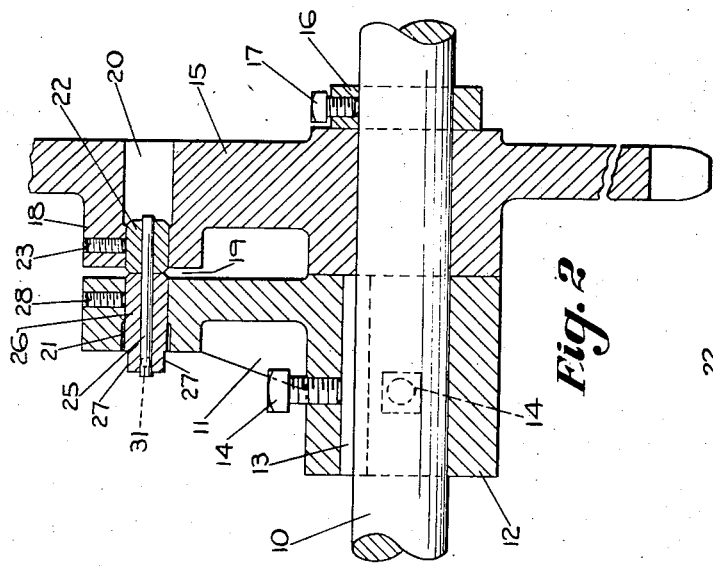
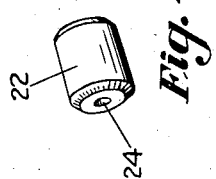
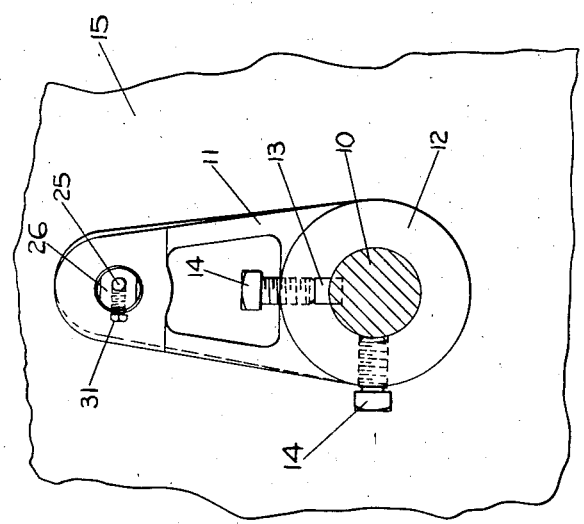
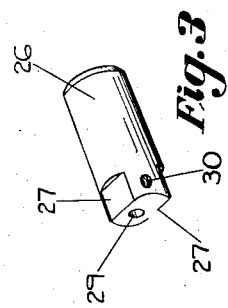
INVENTOR:
STANLEY M. MERCIER,
By Chas. M. Niesen,
ATTY.

Patented Sept. 4, 1945

2,384,188

UNITED STATES PATENT OFFICE 2,384,188

SHEAR PIN MECHANISM

Stanley M. Mercier, Bexley, Ohio, assignor to The Jeffrey Manufacturing Company, a corporation of Ohio Application June 25, 1942, Serial No. 448,396

5 Claims. (Cl. 64—28)

This invention relates to a shear pin mechanism and an object of the invention is to provide simple, inexpensive but highly reliable and consistently operable shear pin mechanism.

Another object of the invention is to provide an improved shear pin bushing mechanism.

Other objects of the invention will appear hereinafter, the novel features and combinations being set forth in the appended claims.

In the accompanying drawing,

Fig. 1 is an end view of the shear pin mechanism comprising my invention;

Fig. 2 is a transverse sectional view of the mechanism of Fig. 1;

Fig. 3 shows one of the bushings of the shear pin mechanism which also comprises a feature of my invention; and Fig. 4 shows another bushing of the shear pin mechanism.

As illustrated particularly in Figs. 1 and 2 of the drawing, the shear pin mechanism includes a shaft 10 upon which is keyed a driving member 11 which is in the form of an arm having a hub 12 keyed to the shaft 10 by a key 13 preferably clamped in place by set screw 14. Mounted loosely upon the shaft 10 is a driven member 15 which as illustrated is in the form of a sprocket wheel, said sprocket wheel 15 being held on the shaft 10 by a collar 16 provided with a set screw 17. The outer end of the driving member or arm 11 is in operation slightly spaced from a boss 18 formed on the sprocket 15, that is, a space 19 exists between the adjacent surfaces of the boss 18 and the arm or driving member 11. Said boss 18 and the outer end of the arm 11 are provided with substantially aligned cylindrical bores or apertures 20 and 21, respectively. Within the bore 20 is a sleeve or bushing 22 preferably made of hardened metal such as hardened steel, said bushing 22, however, being provided with chamfered edges and being symmetrical so that either end thereof may be inserted in the opening in the bore 20. The bushing 22 is axially adjustable along the bore 20 and may be clamped into adjusted position by means of a set screw 23 in said boss 18.

As clearly illustrated in Fig. 2 of the drawing said bushing 22 preferably extends into the opening 19 or, in other words, beyond the plane of the adjacent face of the boss 18. Said bushing 22 is provided with an axial bore 24 which is adapted to receive a removable shear pin 25. Within the bore 21 I provide another sleeve or bushing 26 which is generally of cylindrical shape and has one end chamfered which chamfered edge is adapted to extend beyond the plane of the adjacent face of arm 11 or, in other words, into the space 19 and contact with the abutting face of the sleeve of bushing 22. This sleeve or bushing 26 is provided at its opposite end with tool receiving surfaces 27 by which it can be rotated about its axis while within the bore 21 for a purpose presently to be described. The bushing 26 may also be axially adjusted in said aperture 21 and it is held in any position to which it is adjusted by means of a set screw 28.

The bushing 26 is provided with a longitudinally extending shear pin receiving bore 29 through which the shear pin 25 extends with the bores 24 and 29 in alignment. The bore 29 is eccentric with respect to the axis of the bushing 26 consequently exact alignment of the bores 24 and 29 may be effected by rotating the bushing 26, for example by applying a tool to the tool receiving surfaces 27. This is of considerable practical importance because it has been found in practice to be very difficult otherwise to make two parts such as the driving member or arm 11 and the driven member or sprocket 15 to align the pin receiving apertures either in these members directly or in bushings in said members. As a consequence in many prior devices since the shear pin holes in the driving and driven members were not in exact alignment the shear pins were bent or mutilated when put in operative position and there was no regularity of torque at which they would shear. Furthermore, by providing the space 19 and making one or both of the bushings 22 and 26 axially adjustable, it is possible to obtain more uniform results because substantially only the adjacent ends of the bushings 22 and 26 are in contact and they may be readily adjusted along their axes without regard to where the hubs of the arm 11 and sprocket 15 strike each other. It is, of course, also evident that each of the parts of the shear pin mechanism may be made by ordinary shop methods and no jig for drilling or reaming the arm 11 or sprocket 15 is necessary, since exact alignment or exact contacting surfaces are not required, these being taken care of by the adjustments of the bushings 22 and 26 and particularly of the latter. To removably maintain the shear pin 25 in place the outer end of the bushing 26 is provided with a threaded opening 30 (see Fig. 3) adapted to receive a set screw 31 which clamps said shear pin 25 in place.

In the operation of the mechanism, power on the shaft 10 will be transmitted to the arm 11 which will in turn be transmitted to the shear pin 25 and the sprocket 15 by way of bushings 26 and 22. If a predetermined high torque is developed the shear pin 25 will be sheared.

To insert the shear pin 25 the bores 24 and 29 are brought into alignment and if necessary to accomplish this the bushing 26 may be rotated about its axis which, due to the eccentricity of the bore 29, will make accurate alignment of said bores 24 and 29 possible, whereupon the pin 25 may be inserted without bending it or mutilating it, thus insuring its shearing at a predetermined torque.

One or both of the bushings 22 and 26 may be axially adjusted to bring their inner surfaces in contact within the space 19. Bushing 22 may be reversed to provide double life of the shearing edge.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. Mechanism of the class described comprising a driving member and a driven member mounted for rotation together about a common axis, said two members having substantially aligned bores, the adjacent opposite surfaces of said two members adjacent said bores being spaced apart, removable metal bushings in said bores, at least one of them being axially adjustable to extend beyond the plane of the surface of one of said members and in contact with the other bushing, a set screw for clamping said one bushing in adjustable axial positions, and a shear pin extending through aligned bores in said bushings.

2. Safety mechanism including two members, one a driving member the other a driven member, shear pin means interconnecting said members, said shear pin means including a bushing mounted for adjustment about its axis on one of said members, said bushing being provided with a shear pin opening, said opening being eccentric relative to the axis of said bushing.

3. Apparatus of the class described comprising a driving member and a driven member, said members having aligned bushing receiving bores, generally cylindrical bushings in each of said bores, means for removably clamping at least one of said bushings in various axial positions to which it may be adjusted, said bushings having aligned axial pin receiving openings, the opening of one of said bushings being eccentric relative to the axis of the bushing to bring said pin receiving openings into alignment, and a shear pin extending through aligned bushing openings.

4. Safety drive mechanism including driving and driven members, shear pin means interconnecting said members including a shear pin extending through means providing aligned shear pin receiving openings in said driving and driven members, said means including a bushing mounted in a cylindrical bore in one of said members with the axis of the shear pin opening therein eccentric relative to the axis of said cylindrical bore.

5. Apparatus of the class described comprising a driving member and a driven member, said members having aligned bushing receiving bores, hardened metal generally cylindrical bushings in each of said bores, means for removably clamping at least one of said bushings in various axial positions to which it may be adjusted, said bushings having aligned axial pin receiving openings, the opening of one of said bushings being eccentric relative to the axis of the bushing to bring said pin receiving openings into alignment, and a shear pin extending through aligned bushing openings.

STANLEY M. MERCIER.